June 22, 1965     A. R. ARMSTRONG     3,190,035

AMBULATORY ANIMAL TOYS

Filed Aug. 31, 1962

INVENTOR
Arthur R. Armstrong

BY *Ashley & Ashley*

ATTORNEYS

United States Patent Office 3,190,035
Patented June 22, 1965

3,190,035
AMBULATORY ANIMAL TOYS
Arthur R. Armstrong, Dallas, Tex., assignor of one-third to Lloyd F. Sneed and one-third to Juanita L. Moffett, both of Dallas, Tex.
Filed Aug. 31, 1962, Ser. No. 220,762
10 Claims. (Cl. 46—149)

This invention relates to new and useful improvements in ambulatory animal toys.

One object of the invention is to provide an improved ambulatory animal toy, preferably resembling a dog, which is adapted to undergo walking movements in simulation of a live animal when pulled along a floor or other horizontal or inclined surfaces of substantially any material as well as up and down stairs.

Another object of the invention is to provide an improved ambulatory animal toy which is so constructed that it takes quick short steps and quivers or shakes when walking as well as for a brief interval thereafter so as to give the appearance of a young, frisky live animal.

A further object of the invention is to provide an improved animal toy, of the character described, which is of relatively light-weight construction but sufficiently rugged to withstand rough usage over a long period of time, which is capable of sudden turns without toppling over and which jumps forward without overturning, when its rear portion is depressed, in simulation of the lunges of a live animal.

A construction designed to carry out the invention will be hereinafter described, together with other features of the invention.

Figure 1:
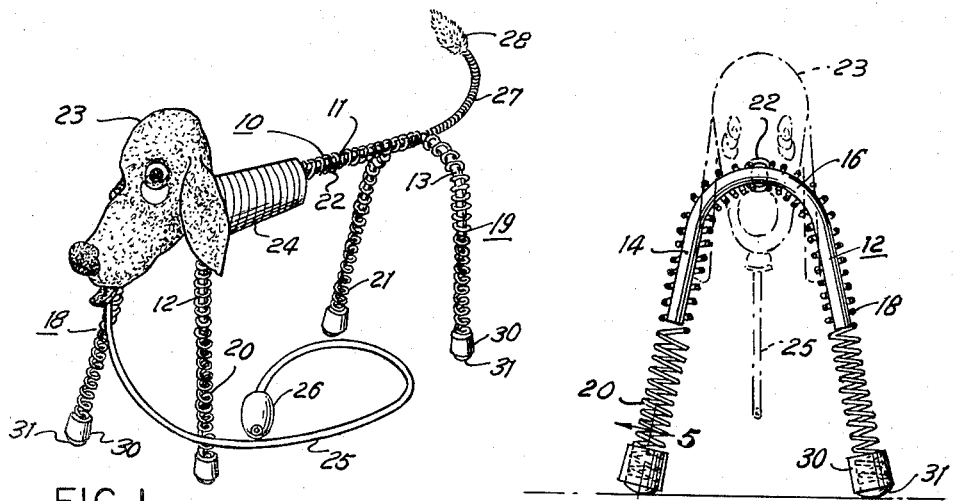
Figure 2:
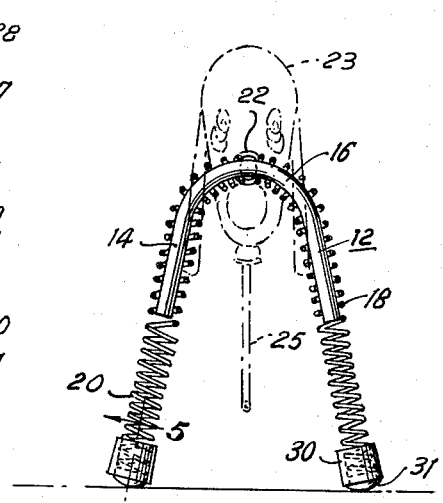
Figure 3:
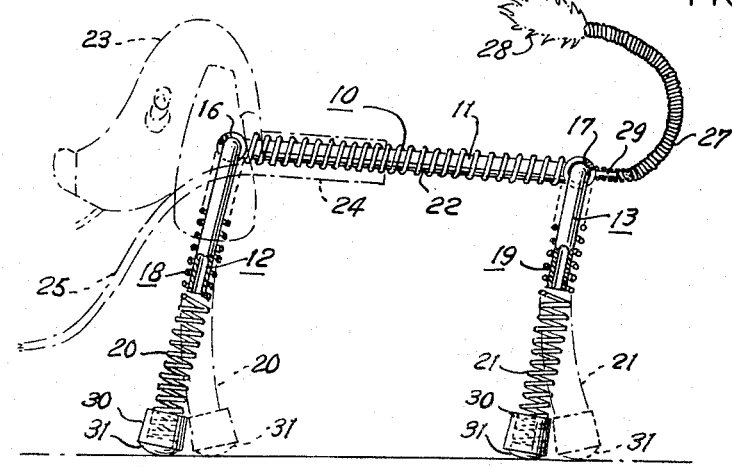
Figures 4, 5:
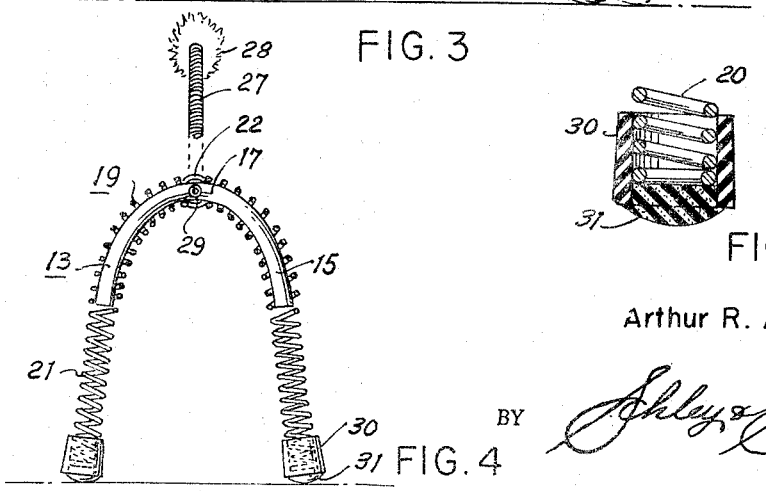

The invention will be more readily understood from a reading of the following specification and by reference to the accompanying drawing, wherein an example of the invention is shown, and wherein:

FIG. 1 is a perspective view of an ambulatory animal toy constructed in accordance with the invention, FIG. 2 is a front elevational view of the toy animal, partly in section, the head and sound means being shown in broken lines and the back legs being omitted, FIG. 3 is a side elevational view, partly in section, showing the movement of the legs as well as the head and sound means of the animal toy in broken lines, FIG. 4 is a rear elevational view, partly in section, with the front legs as well as the head and sound means of the toy being omitted, and FIG. 5 is an enlarged, vertical, sectional view of one of the feet of the toy.

In the drawings, the numeral 10 designates an ambulatory animal toy which resembles a standing dog but which may simulate any four legged animal. Although the toy may be covered, dressed or decorated in any desired manner, the illustrated caricature of a dog is preferred. The toy includes a rigid, longitudinal member or spine 11 and front and rear leg members or yokes 12 and 13, of inverted U-shape, having pairs of legs 14 and 15 and bight or medial portions 16 and 17 alined with and suitably secured to the front and rear ends of the spine whereby the legs depend in transversely spaced relation to said spine. The spine 11 and yokes 12 and 13 are formed of cylindrical, preferably tubular, metal or other suitable rigid material of light weight. Helical springs 18 and 19, of metal wire or other suitable material, surround and are connected to the yokes, being of greater length than said yokes so as to extend below the legs 14 and 15 thereof and provide resilient lower leg portions 20 and 21 whereby the springs are held in U-shape form by said yokes. If desired, each of the springs 18 and 19 may be formed in a pair of sections to facilitate attachment of said springs to the yokes. A similar spring 22 may be coextensive with and surround the spine which is straight.

As shown in FIG. 2, the legs 14 of the front yoke 12 are identical and are disposed symmetrically relative to the longitudinal axis of the spine 11. Also, the yoke legs are substantially straight and are inclined laterally outward so as to direct the lower leg portions 20 of the spring 18 at an outward, lateral inclination so as to resist lateral overturning of the toy. Due to the relatively large radius of the bight portion 16, which is substantially arcuate, this inclination is not excessive and is actually rather slight; however, the legs 14 are widely spaced. As shown in FIG. 3, the front yoke is inclined forwardly at an angle greater than 90° relative to the spine. Preferably, this angularity is approximately 100°. Although the yoke legs 14 are of appreciable length, the lower leg portions 20 of the spring 18 are of slightly greater length than the vertical dimension of the yoke 12.

The legs 15 of the rear yoke 13 are identical and symmetrical with respect to the longitudinal axis of the spine 11, being inclined laterally outward and directing the lower leg portions 21 of the spring 19 at an outward, lateral inclination (FIG. 4). The latter inclination is less than the inclination of the spring portions 20, but the distance between the spring portions 21 is greater due to the yoke legs 15 having more widely spaced lower ends than the yoke legs 14. Also, the rear yoke legs are of less length than the spring portions 21, which are longer than the entire yoke 13, and are curved substantially throughout except at their lower extremities. As a result of this curvature, the bight portion 17 of the rear yoke is formed by the inner end portions of its legs and does not have a substantially constant radius of curvature like the bight portion 16 of the front yoke.

Preferably, the yoke 13 is inclined forwardly at an angle slightly less than the inclination of the yoke 12, such as 5° less so as to extend at a 95° angle relative to the longitudinal axis of the spine 11 (FIG. 3). The front yoke and its spring 18 are of greater length than the rear yoke and its spring 19 whereby the spine is inclined downwardly and rearwardly to a slight degree, this inclination being reduced by the more nearly vertical altitude of said rear yoke. The lower leg portions 20 and 21 of the springs may be of substantially equal length. As shown, the internal diameter of the springs may be greater than the external diameter of the yokes so that the surrounding portions of said springs are spaced from and may undergo slight movement relative to said yokes. It is noted that the springs 18 and 19 are of relatively heavy gauge so as to have sufficient strength to permit their lower portions 20 and 21 to resist deformation and to function as substantially straight, resilient legs for supporting the toy. When the deforming force is removed, each leg portion recovers its original shape as shown by the broken and full lines in FIG. 3. In order to provide flexibility without sacrificing strength, the convolutions of the springs are widely spaced. This spacing, particularly of the lower portions of the springs is much greater than the diameter of the wire or other material of said springs.

A ludicrous head 23 is adapted to be mounted on the front end of the spine 11 and the bight portion 16 of the front yoke 12, being secured thereto in any suitable manner. Rearwardly of the head 23, the spine may have a sound box 24 fastened thereto in underlying relationship and a flexible tube 25, having a conventional air bulb 26 on its outer end, extends forwardly from the sound box beneath said head. In addition to permitting actuation of the sound box 24, the tube 25 functions as a cord or leash for pulling the toy. A resilient curved tail 27 may extent rearwardly and upwardly from the rear end of the spine and the bight portion 17 of the rear yoke 13 and have a tuft 28 at its forwardly-directed outer end. Preferably, the tail 27 is in the form of a helical spring so as to be highly flexible for vibrating and simulating the tail of a live animal when any movement is imparted to the toy. The spring is of relatively small diameter and has closely spaced convolutions, being bent to the desired curvature. A pin 29 projects rearwardly from the rear yoke for attaching the tail thereto.

For resisting movement of the resilient leg portions 20 and 21 when the toy is pulled, each leg portion has a foot 30 mounted on its lower end. As shown most clearly in FIG. 5, each foot 30 may be in the form of a cap in which the lower end of the leg portion is suitably secured and which may be formed of rubber or other suitable material. A semi-spherical element, pad or bottom surface 31 projects from the lower end of each cap for engaging the floor or other supporting surface and is formed of soft rubber or other material having a coefficient of fiction to provide substantial frictional resistance to sliding movement of the foot relative to said floor or other supporting surface. Due to this frictional resistance, the feet remain stationary upon pulling of the toy so as to cause relative rearward flexing of the resilient leg portions as shown by the broken lines in FIG. 3. Continued pulling of the toy results in the force of the resilient leg portions 20 and 21 overcoming the resistance to forward movement and snapping or sudden moving forwardly of the feet 30 in simulation of short steps.

The shortness of the steps provides rapid movement of the feet and imparts bouncy movement to the toy whereby it quivers or shakes. The latter movement continues for a brief interval of time after pulling ceases due to the resiliency of the leg portions. Sharp turns of the toy without topping over are permitted by the reason of the curved contour of the foot pads 31, being assisted by the resiliency of the leg portions which permit lateral as well as longitudinal flexing. Since short steps provide a more life-like appearance, it is most important that the yokes or upper portions of the legs as well as the spine be rigid. Therefore, it is essential that the yoke legs 14 and 15 extend an appreciable distance downwardly within the resilient leg portions so that the length of said leg portions is not excessive and short steps are ensured. Also, the rigidity of the spine and yokes enhances the balance and stability of the toy without impairing the requisite resiliency of the leg portions 20 and 21.

From the foregoing, it is readily apparent that the toy undergoes walking movement in simulation of a live animal when pulled by the tube 25 which functions as a cord. Although the tube should be inclined upwardly, the angle of this inclination is not critical. The toy is adapted to walk along any supporting surface of substantially any material and can be made to walk up and down stairs. Also, the toy jumps or lunges forwardly when its rear portion is depressed. Due to the frictional resistance of the pads 31 and the confinement of the resiliency to the lower leg portions 20 and 21, the toy takes rapid, short steps and not slow, long dragging steps even when said toy is pulled rather slowly. This abrupt or sudden movement of the feet 30 is enhanced by the semi-spherical shape of the pads which permits quick, sharp turns. Since the lower portions of the spring 18 and 19 form the sole support for the toy, it quivers and shakes when movement is imparted thereto as well as for a brief interval thereafter. This simulation of a young frisky live animal is accentuated by the flexibility and vibrating of the tail 27 as well as by the spacing of the convolutions of the lower spring portions 18 and 19 from one another and the relative movement of said convolutions. Preferably, the entire toy has a glossy finish so as to reflect light and render the movements of the various parts of said toy more easily discernible.

The foregoing description of the invention is expanatory thereof and various changes in the size, shape and materials, as well as in the details of the illustrated construction may be made, within the scope of the appended claims, without departing from the spirit of the invention.

What I claim and desire to secure by Letters Patent is:

1. An ambulatory animal toy including a rigid longitudinal members, a pair of substantially rigid yokes of inverted U-shape, each yoke having it bight portion secured to one end of the member and its leg portions depending therefrom in transersely spaced relation to said member, a helical spring extending downwardly from the lower end of each leg portion of each yoke and providing resilient lower portions for the front and rear legs of the toy, the leg portions of the yokes forming rigid upper portions of the front and rear legs and having their lower ends terminating substantially medially of said legs, and frictional means at the lower end of each spring for engaging a supporting surface and resisting relative sliding movement whereby each spring flexes rearwardly when the toy is pulled forwardly and snaps forwardly when the force of the flexed spring overcomes the resistance of the frictional means.

2. An ambulatory animal toy as set forth in claim 1 wherein the frictional means includes a pad having a coefficient of friction sufficient to provide substantial resistance to sliding movement, the pad being of semispherical contour to permit quick sharp turns of the toy without toppling over.

3. An ambulatory animal toy as set forth in claim 1 wherein the frictional means includes a cap surrounding and secured to the lower end of each helical spring and having a bottom surface of sufficient coefficient of friction to provide substantial resistance to sliding movement.

4. An ambulatory animal toy as set forth in claim 1 wherein the springs are inclined forwardly.

5. An ambulatory animal toy as set forth in claim 1 wherein the helical springs have upper portions substantially coextensive with the depending leg portions of each yoke and in concentric relation to said leg portions so as to be reinforced and restrained against flexing movement.

6. An ambulatory animal toy as set forth in claim 5 wherein the depending leg portions of the yokes are inclined forwardly so as to support the helical springs at forward inclinations.

7. An ambulatory animal toy as set forth in claim 1 wherein the helical springs are of relatively heavy gauge so as to support the toy without deformation and have widely spaced convolutions to provide resiliency.

8. An ambulatory animal toy as set forth in claim 1 wherein the front yoke is of greater length than the rear yoke whereby the longitudinal member is inclined downwardly and rearwardly.

9. An ambulatory animal toy including a rigid longitudinal spine, a pair of helical springs of inverted U-shape, each spring having its bight portion fixed to one end of the spine and legs depending therefrom in transversely spaced relation to said spine, rigid means at the bight portion and upper portions of the legs of each spring for preventing movement of said portions, the rigid means being coextensive with substantially one-half of said spring legs, and foot means at the lower ends of the spring legs for engaging a supporting surface and having a coefficient of friction sufficient to resist relative sliding movement whereby the lower portions of said spring legs flex rearwardly when the toy is pulled forwardly and snap forwardly when the force of said flexed spring legs overcomes the frictional resistance of the foot means.

10. An ambulatory animal toy as set forth in claim 9 wherein the rigid means includes a member of inverted U-shape secured to each end of the spine and surrounded in close proximity by the bight portion and upper portions of the legs of each helical spring.

References Cited by the Examiner

UNITED STATES PATENTS

| | | | |
|---|---|---|---|
| 2,663,970 | 12/53 | Brodrib | 46—123 |
| 2,760,303 | 8/56 | Del Mas | 46—163 X |

FOREIGN PATENTS 426,404  10/47  Italy.

RICHARD C. PINKHAM, *Primary Examiner.*